United States Patent
Aoki

(10) Patent No.: US 7,688,258 B2
(45) Date of Patent: Mar. 30, 2010

(54) RADIO WAVE RECEIVING SYSTEM, IMAGING SYSTEM AND RADIO WAVE RECEIVING METHOD

(75) Inventor: Yutaka Aoki, Nisshin (JP)

(73) Assignee: Denso Corporation, Kariya (JP)

( * ) Notice: Subject to any disclaimer, the term of this patent is extended or adjusted under 35 U.S.C. 154(b) by 954 days.

(21) Appl. No.: 11/417,350

(22) Filed: May 3, 2006

(65) Prior Publication Data

US 2006/0276152 A1    Dec. 7, 2006

(30) Foreign Application Priority Data

May 19, 2005    (JP)    ............... 2005-146757

(51) Int. Cl.
*G01S 13/89* (2006.01)
(52) U.S. Cl. ...................... 342/179; 342/197
(58) Field of Classification Search .......... 342/179, 342/195, 197
See application file for complete search history.

(56) References Cited

U.S. PATENT DOCUMENTS

| | | | |
|---|---|---|---|
| 3,909,827 A * | 9/1975 | Tricoles et al. .............. 342/179 |
| 5,451,876 A * | 9/1995 | Sandford et al. ............ 324/322 |
| 5,677,695 A | 10/1997 | Suzuki et al. |
| 5,760,397 A | 6/1998 | Huguenin et al. |
| 6,556,836 B2 | 4/2003 | Lovberg et al. |
| 6,587,699 B2 | 7/2003 | Olsen et al. |
| 6,611,696 B2 | 8/2003 | Chedester et al. |
| 6,665,546 B2 | 12/2003 | Slaughter et al. |
| 6,683,679 B2 | 1/2004 | Belenkii |
| 6,714,800 B2 | 3/2004 | Johnson et al. |
| 6,738,147 B2 | 5/2004 | Yafuso |
| 6,937,182 B2 | 8/2005 | Lovberg et al. |
| 7,062,293 B2 | 6/2006 | Johnson et al. |
| 7,065,326 B2 | 6/2006 | Lovberg et al. |
| 7,170,442 B2 | 1/2007 | Lovberg et al. |
| 7,194,236 B2 | 3/2007 | Lovberg et al. |
| 7,248,204 B2 | 7/2007 | Lovberg et al. |
| 7,385,549 B2 | 6/2008 | Lovberg et al. |
| 7,415,244 B2 | 8/2008 | Kolinko et al. |

(Continued)

FOREIGN PATENT DOCUMENTS

JP    07-191151    7/1995

(Continued)

OTHER PUBLICATIONS

Office action dated Oct. 21, 2007 in corresponding Japanese Application No. 2005-146757.

*Primary Examiner*—John B Sotomayor
(74) *Attorney, Agent, or Firm*—Harness, Dickey & Pierce, PLC

(57) ABSTRACT

The present disclosure relates to a radio wave receiving system. The system includes an antenna that is operable for receiving a received signal. The received signal contains information. The radio wave receiving system also includes a reference signal generator that is operable for generating a reference signal. In addition, a selective output device is included that is operable for selectively outputting the received signal and the reference signal to a transmission path. The system also includes an information acquiring device that is operable for generating a signal component indicating a signal level difference between the received signal and the reference signal. The information acquiring device is further operable for acquiring the information from the signal component.

2 Claims, 8 Drawing Sheets

U.S. PATENT DOCUMENTS

| | | |
|---|---|---|
| 7,432,846 B2 | 10/2008 | Martin et at |
| 2002/0164946 A1 | 11/2002 | Olsen et al. |
| 2002/0164958 A1 | 11/2002 | Slaughter et al. |
| 2002/0164959 A1 | 11/2002 | Olsen et al. |
| 2002/0164960 A1 | 11/2002 | Slaughter et al. |
| 2002/0165001 A1 | 11/2002 | Phillips et al. |
| 2002/0165002 A1 | 11/2002 | Kolinko et al. |
| 2002/0176139 A1 | 11/2002 | Slaughter et al. |
| 2002/0187754 A1 | 12/2002 | Chedester et al. |
| 2003/0022694 A1 | 1/2003 | Olsen et al. |
| 2003/0027586 A1 | 2/2003 | Johnson et al. |
| 2003/0060171 A1 | 3/2003 | Lovberg et al. |
| 2004/0075824 A1 | 4/2004 | Belenkii et al. |
| 2005/0258821 A1 * | 11/2005 | Wang et al. ............... 324/200 |
| 2005/0271125 A1 | 12/2005 | Chedester et al. |
| 2006/0002455 A1 | 1/2006 | Johnson et al. |
| 2006/0111047 A1 | 5/2006 | Louberg et al. |
| 2006/0178142 A1 | 8/2006 | Lovberg et al. |
| 2006/0253885 A1 | 11/2006 | Murphy et al. |
| 2006/0264210 A1 | 11/2006 | Lovberg et al. |
| 2006/0276152 A1 * | 12/2006 | Aoki ....................... 455/226.4 |
| 2007/0013513 A1 | 1/2007 | Tang et al. |
| 2008/0100504 A1 | 5/2008 | Martin et al. |
| 2008/0153549 A1 | 6/2008 | Korevaar et al. |
| 2008/0207200 A1 | 8/2008 | Fein et al. |
| 2009/0258652 A1 | 10/2009 | Lambert et al. |

FOREIGN PATENT DOCUMENTS

| | | |
|---|---|---|
| JP | 9-80149 | 3/1997 |
| JP | 9-133722 | 5/1997 |
| JP | 09-197042 | 7/1997 |
| JP | 10-153655 | 6/1998 |
| JP | 11-264736 | 9/1999 |
| JP | 2006322833 A * | 11/2006 |
| WO | WO 2005/017559 | 2/2005 |

* cited by examiner

COOLANT

RADIO WAVE RECEIVING SYSTEM, IMAGING SYSTEM AND RADIO WAVE RECEIVING METHOD

CROSS-REFERENCE TO RELATED APPLICATION

This application is based on Japanese Patent Application No. 2005-146757 filed on May 19, 2005, the disclosure of which is hereby incorporated by reference.

FIELD OF THE INVENTION

The present invention relates generally to radio wave transmission and, more particularly, relates to a radio wave receiving system, imaging system and a radio receiving method.

BACKGROUND OF THE INVENTION

Radio wave receiving systems have been developed for a variety of uses. For instance, radio wave receiving systems have been developed for the transmission of images. In conventional systems, an antenna receives image information contained on a "received signal." The information is acquired by converting the received signal into an intermediate wave, amplifying the intermediate wave, and then detecting the image information (see Japanese Patent Laid-open No. 07-191151A2 or the like).

Under certain conditions, these conventional systems may not acquire accurate information via the radio waves. For instance, signal noise may detrimentally affect the receiving system's ability to acquire information. Specifically, if the signal level of the noise is greater than the signal level of the received signal, then the information contained in the received signal is less likely to be acquired properly. This problem is especially apparent in passive systems that receive radio waves radiated from a target region.

Furthermore, temperature fluctuations may detrimentally affect the ability of the receiving system to acquire information. Specifically, if the temperature of the receiving system fluctuates, signal levels may, in turn, fluctuate. Accordingly, these signal level fluctuations may detrimentally affect the receiving system's ability to accurately acquire information.

SUMMARY OF THE INVENTION

The present disclosure relates to a radio wave receiving system. The system includes an antenna that is operable for receiving a received signal. The received signal contains information. The radio wave receiving system also includes a reference signal generator that is operable for generating a reference signal. In addition, a selective output device is included that is operable for selectively outputting the received signal and the reference signal to a transmission path. The system also includes an information acquiring device that is operable for generating a signal component indicating a signal level difference between the received signal and the reference signal. The information acquiring device is further operable for acquiring the information from the signal component.

In another aspect, the present disclosure relates to an imaging system for producing an image of at least a portion of a target region. The imaging system includes an antenna operable for receiving a received signal radiated from the target region. The received signal includes image information corresponding to the target region. The imaging system also includes a reference signal generator that is operable for generating a reference signal. The imaging system additionally includes a selective output device that is operable for selectively outputting the received signal and the reference signal to a transmission path. Furthermore, the imaging system includes an information acquiring device that is operable for generating a signal component. The signal component indicates a signal level difference between the received signal and the reference signal. The information acquiring device is also operable for acquiring the image information from the signal component. The imaging system further includes an image producing device that is operable for producing the image of the target region based on the image information acquired from the signal component.

In still another aspect, the present disclosure relates to a method of acquiring information. The method includes receiving a radio wave in the form of a received signal, wherein the received signal includes information. The method also includes generating a reference signal with a reference signal generating device. Furthermore, the method includes selectively outputting the received signal and the reference signal to a transmission path. Also, the method includes generating a signal component indicating a signal level difference between the received signal and the reference signal, and acquiring the information from the signal component.

DETAILED DESCRIPTION OF THE PREFERRED EMBODIMENTS

Figure 1:
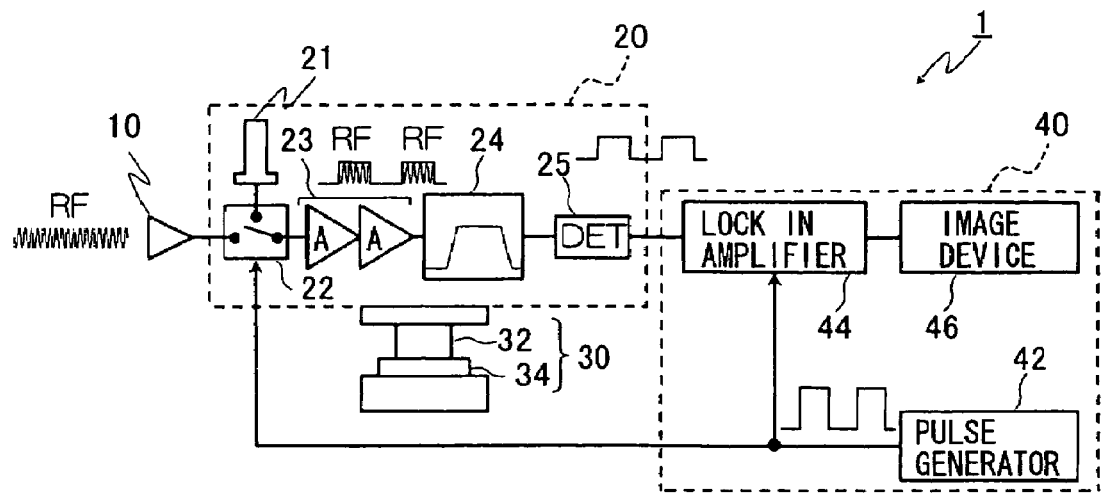
FIG. 1 is a schematic illustration of one embodiment of an imaging system.

Referring now to FIG. 1, an imaging system 1 is schematically illustrated. In general, the imaging system 1 is operable for producing an image of a target region (see e.g., FIGS. 3A, 3B, 5A, and 5B). In one embodiment, the imaging system 1 receives radio waves radiated from the target region. Also, the imaging system 1 can produce an image of the target region even if the target region is obscured by clothing, fog, or the like. As will be discussed, the imaging system 1 is less susceptible to the influence of signal noise and/or temperature fluctuations to thereby provide improved imaging results.

In one embodiment, the imaging system 1 is a passive millimeter wave imaging system. However, it will be appreciated that the imaging system 1 could be an active system rather than a passive system. Also, it will be appreciated that the imaging system 1 could perform imaging using waves of any suitable frequency band.

The imaging system 1, as shown in FIG. 1, generally includes an antenna 10 operable for receiving a received signal of radio frequency (labeled "RF") from the target region. In one embodiment, the antenna 10 is a unidirectional Cassegrain antenna that can receive radio waves having a wavelength of one to ten millimeters and that are reflected in a primary reflector and a secondary reflector.

The imaging system 1 also includes a radio wave receiving device 20 operable for acquiring image information included in the received signal. Furthermore, the imaging system 1 includes a state shifting device 30 operable for shifting the radio wave receiving device 20 to thereby allow the antenna 10 to receive the received signals from a variety of directions. In another embodiment, the state shifting device 30 shifts the antenna 10 to thereby allow the antenna 10 to receive the received signals from a variety of directions. In addition, the imaging system 1 includes an image producing device 40 operable for producing an imaging result (see e.g., FIGS. 3B and 5B) of the target region based on the image information acquired by the radio wave receiving device 20.

As shown, the radio wave receiving device 20 includes a reference signal generator 21 that is operable for generating a reference signal at a predetermined signal level. In one embodiment, the reference signal generator 21 is a terminator.

The receiving device 20 further includes a selective output device 22 that is operable for selectively outputting the received signal and the reference signal to the transmission path to be described. In one embodiment, the selective output device 22 is a switch that alternatively outputs the received signal and the reference signal.

The receiving device 20 also includes at least one amplifier 23 operable for amplifying the signal level of the signal output by the selective output device 22. Furthermore, the receiving device 20 includes a bandpass filter 24 (labeled "BPF") that allows only signals of a predetermined wavelength to be output (e.g., signals having a wavelength of one to ten millimeters). The receiving device 20 also includes a signal detecting part 25 (labeled "DET") operable for detecting a signal passing through the bandpass filter 24.

As shown, the selective output device 22 is in communication with the antenna 10 and the reference signal generator 21. The amplifier 23 is in communication with the selective output device 22. Furthermore, the bandpass filter 24 is in communication with the amplifier 23, and the signal detecting part 25 is in communication with the bandpass filter 24.

Moreover, the state shifting device 30 includes an elevation stage 32 for changing the direction of the elevation angle (i.e., the vertical direction) of the radio wave receiving device 20. The state shifting device 30 also includes an azimuth stage 34 for changing the direction of the azimuth angle (i.e., the horizontal direction) of the radio wave receiving device 20. As will be discussed in greater detail, the state shifting device 30 successively shifts the state (i.e., the direction) of the radio wave receiving device 20 so that a plurality of received signals can be received by the antenna 10, each corresponding to a different portion of the target region. As such, an image of the entire target region can be produced.

The image producing device 40 includes a pulse generator 42 operable for outputting a synchronizing signal of a predetermined frequency. The pulse generator 42 is in communication with the selective output device 22, and the selective output device 22 outputs either the received signal or the reference signal according to the cycle of the synchronizing signal. In another embodiment, the selective output device 22 outputs either the received signal or the reference signal according to the signal level of the synchronizing signal.

The image producing device 40 also includes a lock-in amplifier 44 operable for generating a signal component. As will be discussed, image information transmitted in the received signal can be extracted from the signal component by the lock-in amplifier 44. Furthermore, the image producing device 40 includes an image producing device 46 operable for producing the image of the entire target region based on image information extracted by the lock-in amplifier 44.

As shown, the lock-in amplifier 44 is in communication with the signal detecting part 25. The image producing device 46 is in communication with the lock-in amplifier 44. Also, the pulse generator 42 is in communication with both the lock-in amplifier 44 and the selective output device 22.

In operation, the pulse generator 42 supplies synchronizing signals to the selective output device 22 and the lock-in amplifier 44. The synchronizing signals change between an H level and an L level at a predetermined frequency, such as 100 kHz. When the selective output device 22 receives the synchronizing signal at the H level, the selective output device 22 outputs the received signal to the transmission path. Alternatively, when the selective output device 22 receives the synchronizing signal at the L level, the selective output device 22 outputs the reference signal to the transmission path. Accordingly, the received signal and the reference signal are alternatively outputted to the transmission path at a known frequency.

Also, in one embodiment, the lock-in amplifier 44 converts the frequency of the received signal by mixing the received signal with the synchronizing signal from the pulse generator 42. Then, the lock-in amplifier 44 generates the signal component by extracting only a desired frequency component from the frequency-converted received signal. Image information originally contained on the received signal is acquired from the signal component. The image information is thus used to create the image of the target region. In another embodiment, an offset component caused by the influence of the reference signal is removed from the signal component to thereby provide the image information for the particular image unit.

Assuming that the signal level of the reference signal remains relatively constant, signal level fluctuations of the signal component will be substantially due to signal level fluctuations of the received signal. These fluctuations in the signal component thus represent the image information contained in the received signal. Thus, the image information can be acquired from the signal component by detecting the fluctuations in the signal level of the signal component.

The signal component is generated in order to reduce the influence of a noise component included in the transmission. More specifically, the received signal and the reference signal are both superimposed with a noise component due, for instance, to temperature fluctuations in the transmission path. By finding a difference between signal levels of the received signal and the reference signal, the noise component superimposed on both can be significantly reduced or cancelled.

It is noted that the radio wave receiving device 20 need not use a signal source because the terminator 21 generates the reference signal at a predetermined signal level. Thus, the signal level of the reference signal can be relatively small in comparison to imaging systems of the prior art that include a signal source. Hence, even when the signal level of the received signal is relatively small, the signal level of the reference signal can be set to be smaller than in the construction with a signal source used. Accordingly, the influence of a reference signal can be reduced, thereby avoiding a case in which the received signal is overly influenced (i.e. "buried") by the reference signal. However, it will be appreciated that a signal source may be employed to generate signals having a predetermined bandwidth. For example, the signal source may be used to generate white noise at a fixed signal level.

In one embodiment, the image producing device 46 is a personal computer. The image producing device 46 generates the image of the target region according to a method illustrated in FIG. 2.

As shown, the method begins in step 110, wherein the image producing device 46 sends a command to the state shifting device 30 to thereby successively shift the state of the radio wave receiving device 20. In other words, the direction in which the antenna 10 receives radio waves is successively changed. As a result, the antenna 10 successively receives radio waves from a plurality of image units of the target region (i.e., distinct portions of the target region). The receiving direction of the antenna 10 changes less frequently than the frequency of switching of the selective output device 22. For instance, in one embodiment, the receiving direction of the antenna 10 changes every second, and the cycle in which the selective output device 22 is switched is 1/100 kHz.

Next, in step 120, image information is acquired for each image unit of the target region. More specifically, the lock-in amplifier 44 generates a signal component for each image unit of the target region. Image information for each image unit is acquired from the corresponding signal component. The image information is then stored in memory of the image producing device 46. Image information is acquired until image information has been collected for the entire target region (i.e., until image producing device 46 stops sending commands to the state shifting device 30) as represented by decision block 130.

In step 140, the imaging result of the target region is produced. More specifically, the image of the target region is produced by arraying the image information generated in step 120. The image information for a particular image unit is arrayed in a position that corresponds with its actual position in the target region. As such, the imaging result represents the entire target region.

It will be appreciated that the target region could be of any suitable size. It will also be appreciated that the target region could include any suitable number of image units.

Figure 3A:
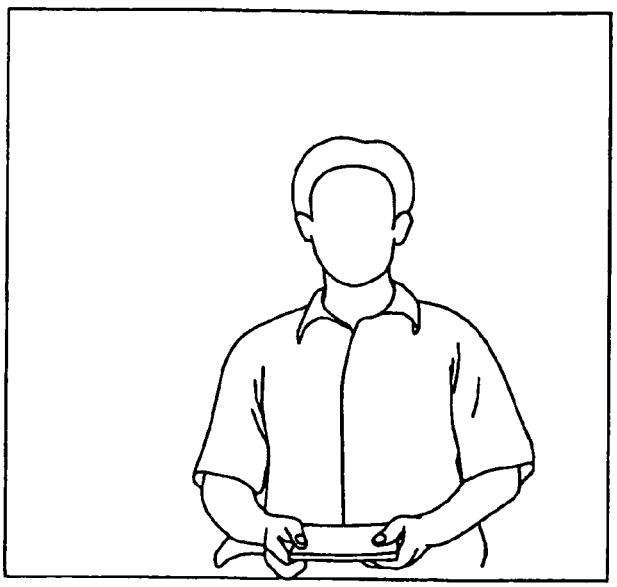
FIG. 3A is one embodiment of a target region.
Figure 3B:
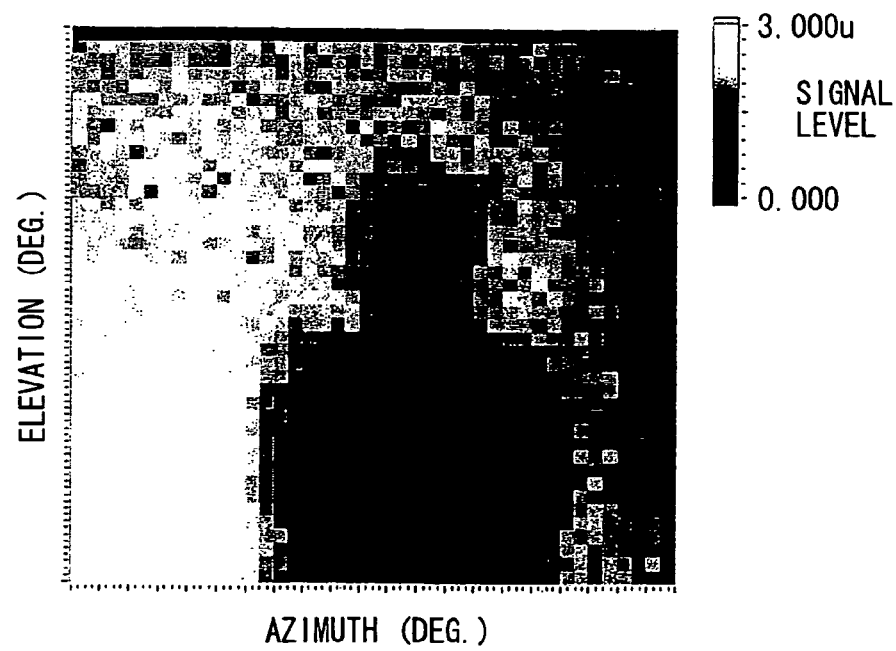
FIG. 3B is an imaging result of the target region of FIG. 3A using the imaging system of FIG. 1.

Referring now to FIGS. 3A and 3B, one embodiment of the imaging of a human body is illustrated. The bandpass filter 24 is set to allow signals having a predetermined frequency (e.g., 76.5 GHz±0.5 GHz) radiated from the human body and its background space to pass through the bandpass filter 24. Moreover, the imaging system 1 is spaced from the target region (FIG. 3A) so that the distance between the antenna 10 and the target region is approximately 2.3 m and the height of the antenna 10 is 0.9 m. As such, the target region lies in a range of ±10 degrees in an azimuth angle direction and ±10 degrees in an elevation angle direction. Also, parameters are set to cause the state shifting device 30 to successively change the direction of the radio wave receiving device 20 such that the "receiving direction" of the antenna 10 changes in steps of 0.5 degrees throughout the target region.

Figure 2:
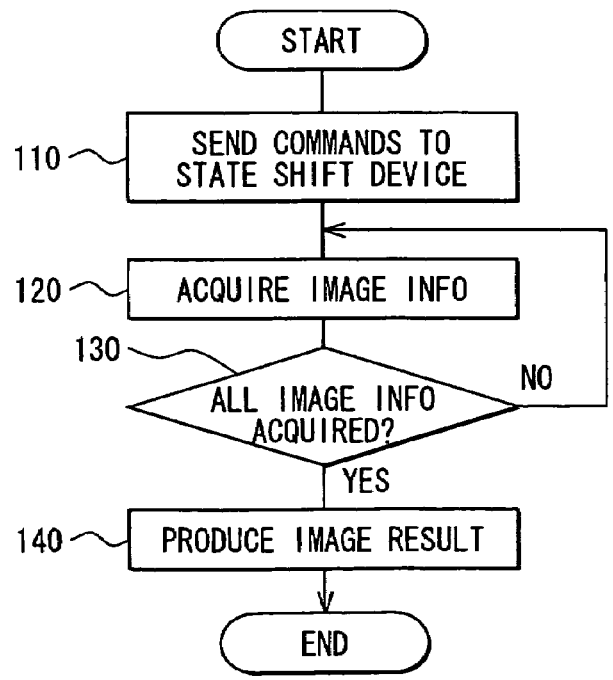
FIG. 2 is a flowchart illustrating a method of operating the imaging system of FIG. 1.

Then, the image producing device 46 executes the method shown in FIG. 2 to create the imaging result shown in FIG. 3B. As the color of the target region deepens, the signal level of the corresponding received signal increases.

Figure 4A:
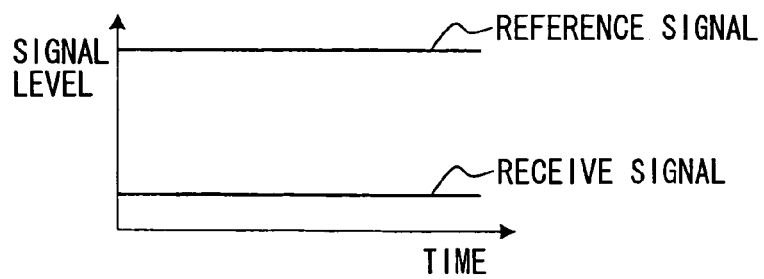
FIG. 4A is a graph showing the signal level of a received signal and a reference signal.
Figure 4B:
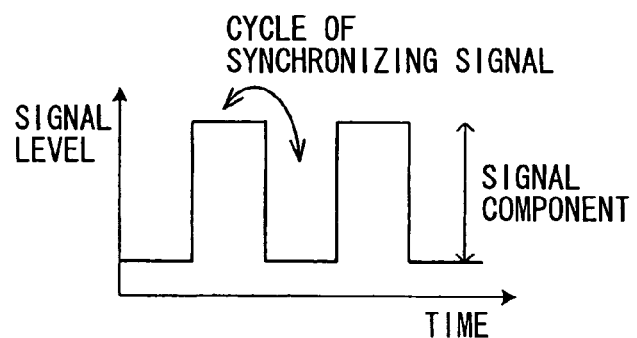
FIG. 4B is a graph showing the signal level of a signal component.

As graphically illustrated in FIGS. 4A and 4B, the signal level of the reference signal is higher than the signal level of the received signal. Thus, as the signal level of the received signal becomes higher, the signal level of the signal component becomes smaller. As a result, the color in the imaging result becomes deeper in a region where the signal level of the received signal is higher (i.e., where the signal level of the radiated radio wave is higher). Thus, higher signal levels can be received in a region corresponding to the human body, and the shape of the human body can be detected by the imaging system 1.

Figure 5A:
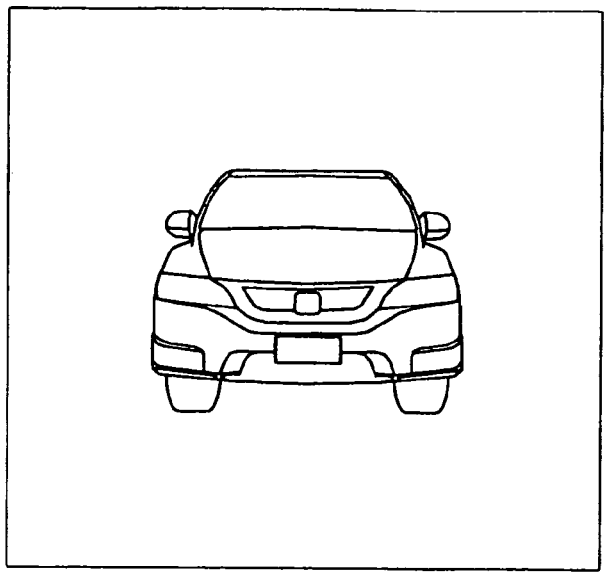
FIG. 5A is another embodiment of a target region.
Figure 5B:
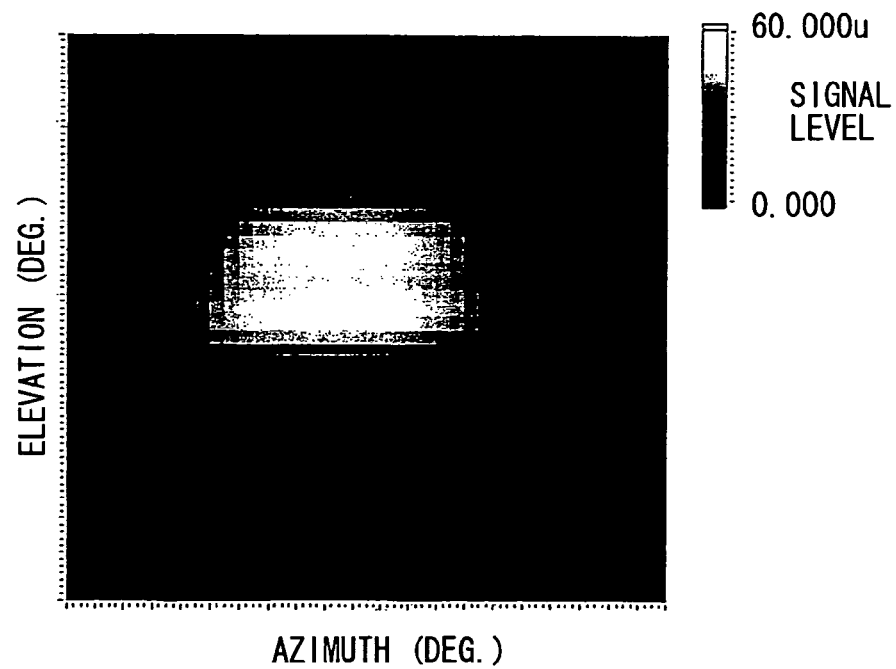
FIG. 5B is an imaging result of the target region of FIG. 5A using the imaging system of FIG. 1.

Referring now to FIGS. 5A and 5B, one embodiment of imaging a vehicle is illustrated. In this embodiment, the bandpass filter 24 is set to allow a signal of a predetermined frequency (e.g., 76.5 GHz±0.5 GHz) radiated from the target region to pass through the bandpass filter 24. Moreover, the imaging system 1 is spaced from the target region such that the distance between the antenna 10 and the target region is 7 m and the height of the antenna 10 is 0.73 m. As such, the target region lies in a range of ±10 degrees in an azimuth angle direction and ±10 degrees in an elevation angle direction. Also, parameters are set to cause the state shifting device 30 to successively change the direction of the radio wave receiving device 20 such that the "receiving direction" of the antenna 10 changes in steps of 0.5 degrees throughout the target region.

Then, the image producing device 46 executes the method shown in FIG. 2, and produces the image shown in FIG. 5B. As shown in FIG. 5B, as a color becomes deeper, the signal level of a signal component outputted from the radio wave receiving device 20 reduces, similar to the embodiment shown in FIG. 3B and described above. Accordingly, signals having lower signal levels are received in the location of the vehicle as compared to the background. Thus, the shapes of the vehicle windshield and the front of the vehicle are imaged by the imaging system 1.

Figure 6A:
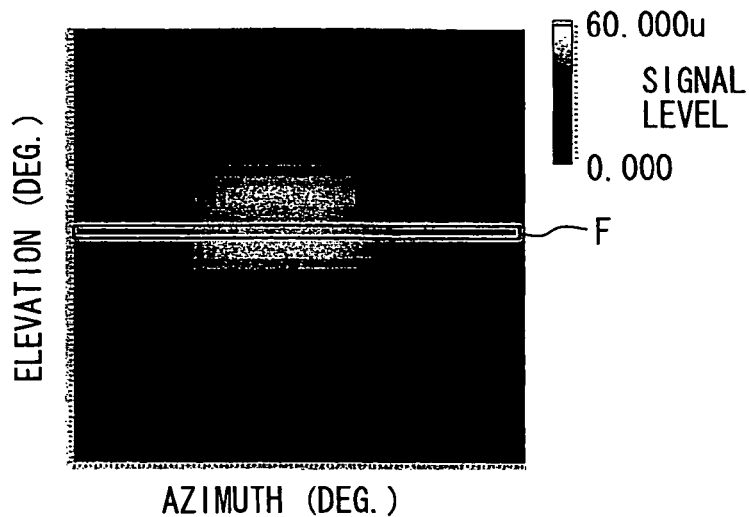
FIG. 6A represents an analysis of the imaging result of FIG. 5B.
Figure 6B:
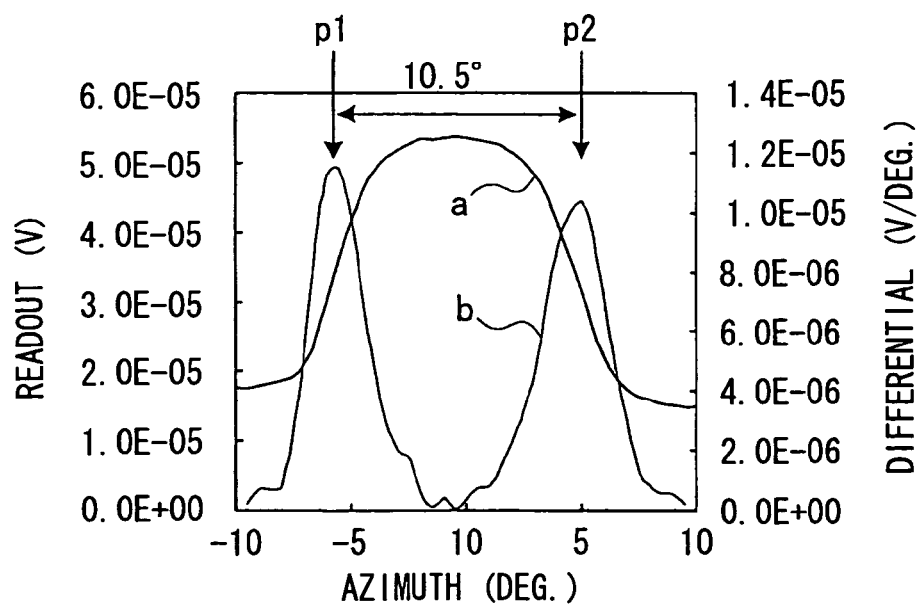
FIG. 6B is a graph illustrating an analysis of the imaging result of FIG. 5B.

A portion of the imaging result of FIG. 5B is analyzed in FIGS. 6A and 6B. The portion analyzed is shown in a horizontal frame (labeled "F") in FIG. 6A, and the result of the analysis is shown graphically in FIG. 6B. The horizontal axis of FIG. 6B represents position (i.e., azimuth angle) of the image unit, and the vertical axis represents signal level of the signal output from the radio wave receiving device 20.

The line "a" in FIG. 6B represents the signal level versus the azimuth angle. The line "b" represents the changes in signal level converted into the absolute value of the signal level difference with respect to the horizontal axis (i.e., the signal level differential with respect to the azimuth angle). Two peak positions (labeled "p1" and "p2" in FIG. 6B) appear in line "b." In the embodiment shown, the interval between the peak positions is 10.5 degrees. As mentioned above, the distance between the antenna 10 and the target region is 7.4 meters. Thus:

$$\text{Width of Vehicle in Image} = 2 \times 7.4 \times \tan(10.5/2) = 1.4 \text{ meters}$$

This result approximately corresponds with the actual width of the vehicle. Accordingly, the accuracy of the image result is further confirmed.

Figure 7:
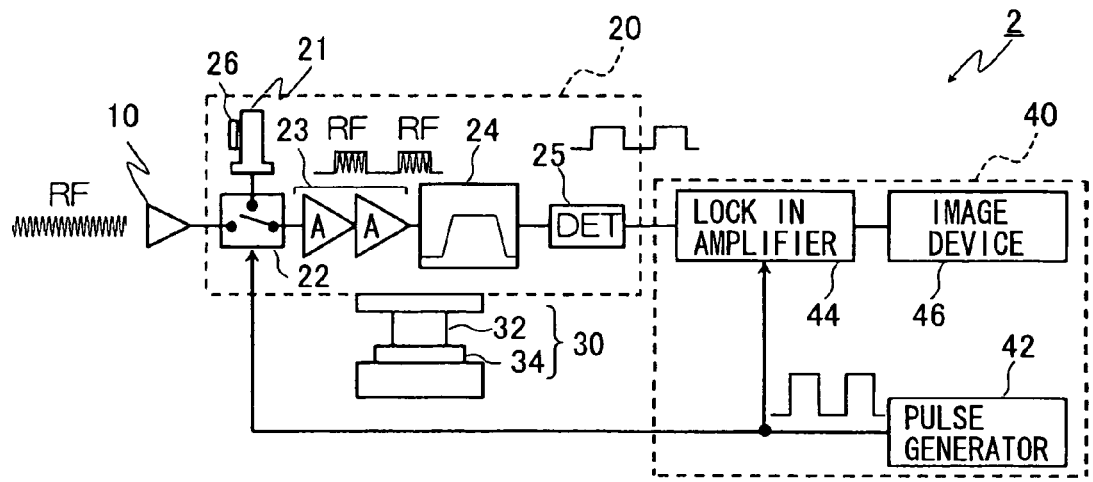
FIG. 7 is a schematic illustration of another embodiment of the imaging system.
Figure 8:
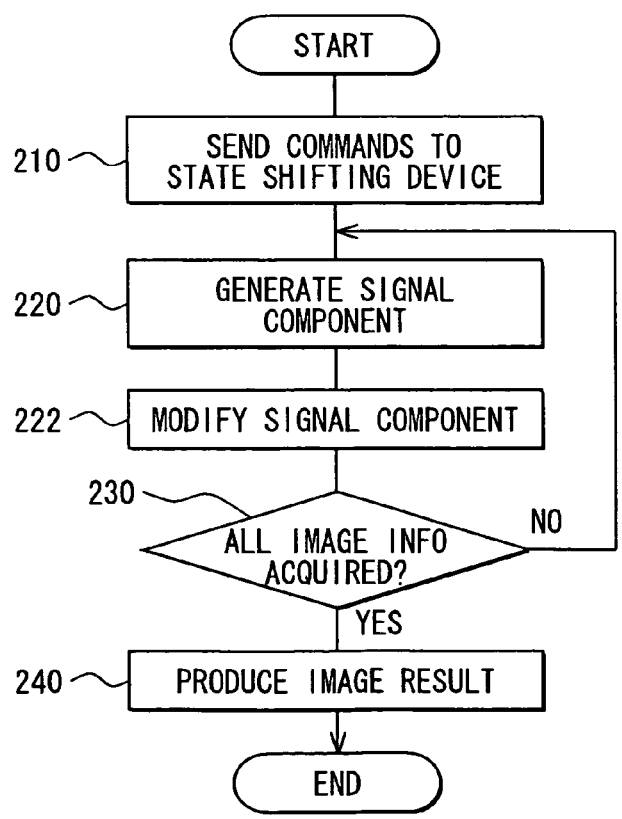
FIG. 8 is a flowchart illustrating another embodiment of a method of operating the imaging system of FIG. 7.

Referring now to FIGS. 7 and 8, another embodiment of the imaging system 2 is illustrated. The imaging system 2 of FIGS. 7 and 8 is similar in construction as the imaging system 1 in the embodiment shown in FIG. 1, and similar components are indicated with similar reference numbers. However, as shown in FIG. 7, the imaging system 2 includes a temperature monitor 26. The temperature monitor 26 is included in the wave receiving device 20 and is operable for detecting the temperature of the terminator 21 as will be discussed below.

The method of imaging with the imaging system 2 begins in step 210 as shown in FIG. 8. In step 210, the image producing device 46 sends a command to the state shifting device 30 to thereby successively shift the state of the radio wave receiving device 20. In other words, the direction in which the antenna 10 receives radio waves is successively changed. As a result the antenna 10 successively receives radio waves from a plurality of image units of the target region (i.e., distinct portions of the target region).

Next, in step 220, the lock-in amplifier 44 generates signal components for each image unit of the target region. This step is discussed in detail above.

Then, in step 222, the image producing device 46 modifies the signal components based on the temperature of the terminator 21 detected by the temperature monitor 26. For example, the terminator 21 may generate heat during operation, and the signal level of the reference signal may change as a result. Thus, to compensate for the signal level changes, the signal level of the signal components is adjusted in step 222. In one embodiment for instance, when the temperature of the terminator 21 rises, the signal level of the signal components is lowered in step 222. It will be appreciated that only some of the signal components may be modified, and it will also be appreciated that the signal components can be adjusted individually to any suitable signal level.

In another embodiment, the image information is acquired from the signal component by removing an offset component from the signal component. (The offset component is caused by the influence of the reference signal on the signal component.) Thus, in this embodiment, step 222 involves modifying (i.e., increasing or decreasing) the offset component according to the temperature of the terminator 21.

The signal components are generated and modified until image information has been collected for the entire target region (i.e., until the image producing device 46 stops sending commands to the state shifting device 30). Finally, in step 240, the image producing device 46 arrays the individual image units to thereby produce the imaging result of the target region.

Thus, the imaging system 2 can produce an image of a target region. In this embodiment, temperature changes of the terminator 21 will have an insignificant effect on the quality of the imaging because the signal components are modified according to the temperature of the terminator. Accordingly, the imaging system 2 can produce quality images under a variety of temperature conditions.

Figure 9:
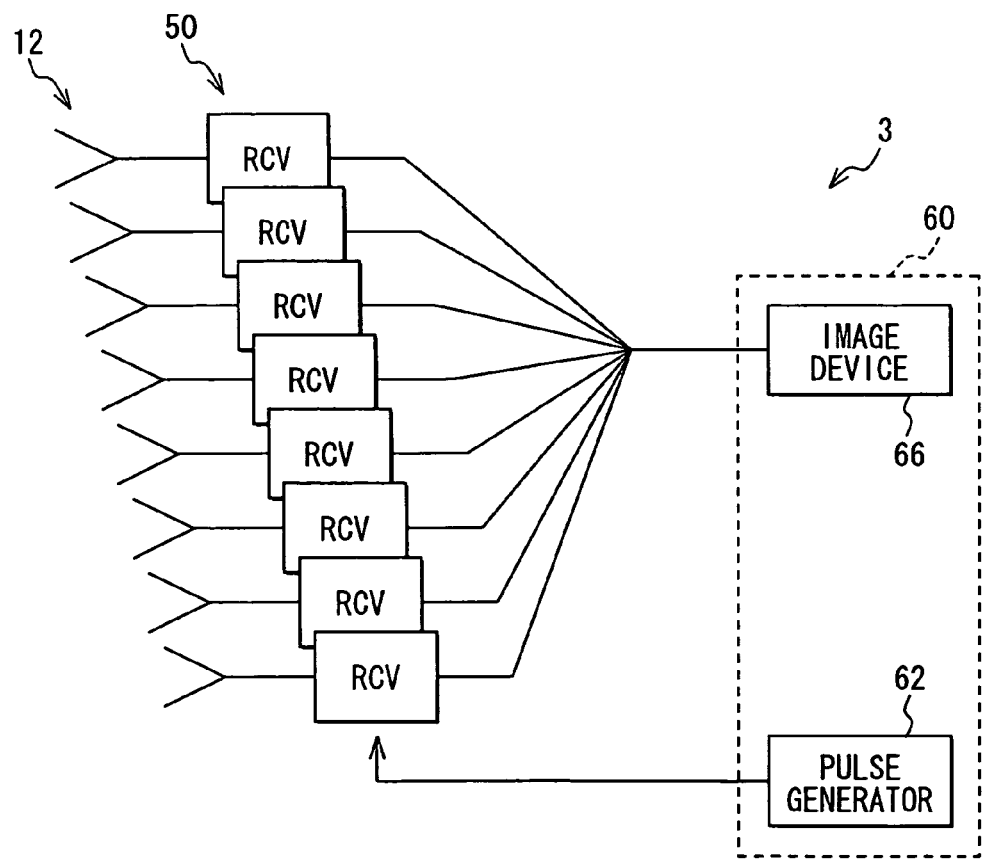
FIG. 9 is a schematic illustration of another embodiment of the imaging system.
Figure 10A:
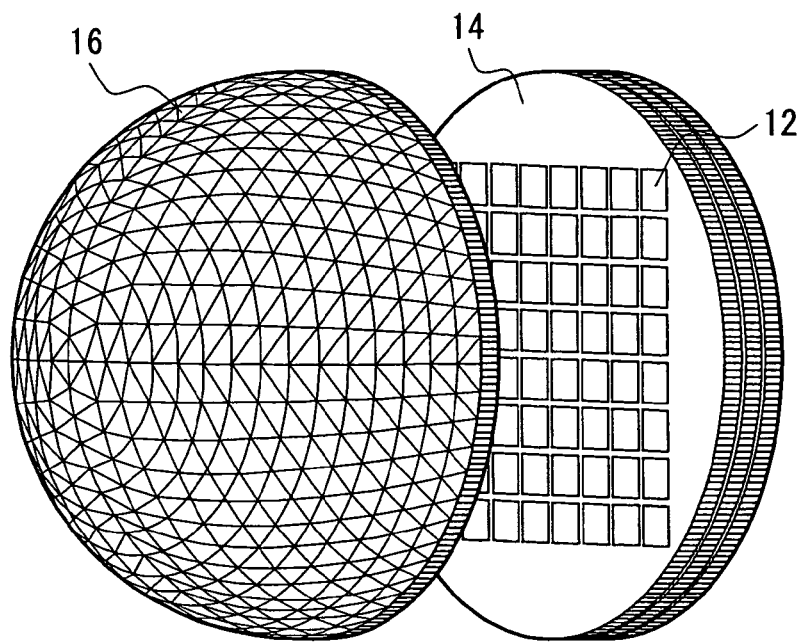
FIGS. 10A and 10B are schematic illustrations of portions of the imaging system of FIG. 9.
Figure 10B:
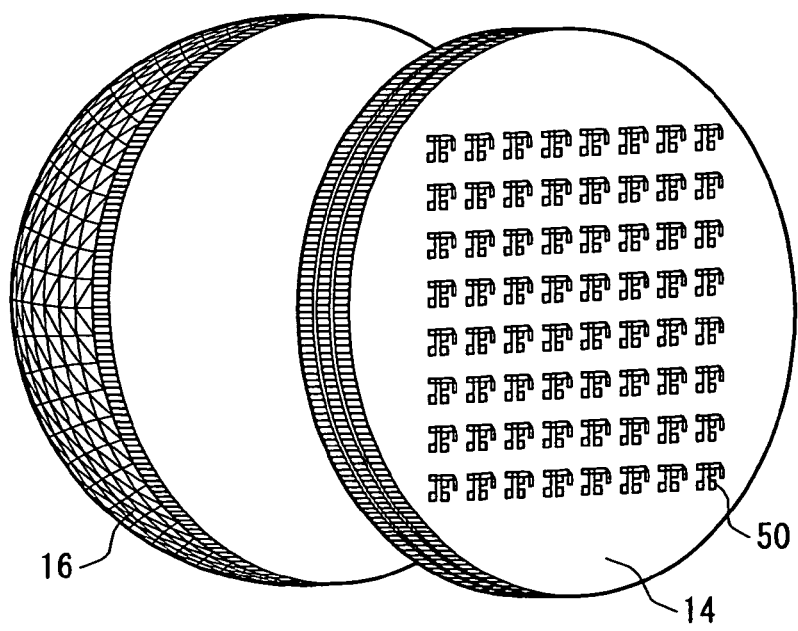

Referring now to FIGS. 9, 10A and 10B, another embodiment of the imaging system 3 is illustrated. The imaging system 3 includes a plurality of antennae 12. Each of the antennae 12 is able to receive radio waves (i.e., received signals) radiated from a different portion of the target region. The imaging system 3 further includes a plurality of radio wave receiving devices (labeled "RCV") 50. Each of the radio wave receiving devices 50 is in communication with a corresponding one of the antennae 12. The radio wave receiving devices 50 generally include the same components as the radio wave receiving device 20 described in detail above with reference to FIG. 1 and/or FIG. 7. Therefore, the radio wave receiving devices 50 of FIG. 9 are each operable to acquire image information from the received signal received by the corresponding antenna 12.

As shown in FIG. 10A, the antennae 12 are formed as pattern antennae on the surface of a substrate 14. Also, as shown in FIG. 10B, the radio wave receiving devices 50 corresponding to the antennas 12 are formed on an opposite surface of the substrate 14. The substrate 14 further includes a plurality of lenses 16. Each lens is operable for directing radio waves from a particular portion of the target region to one of the antennae 12.

Referring back to FIG. 9, the imaging system 3 further includes an image producing device 60. The image producing device 60, like the embodiments shown in FIGS. 1 and 7, includes a pulse generator 62 and an image producing part 66. The pulse generator 62 supplies a synchronizing signal to the radio wave receiving devices 50 similar to the embodiments of FIGS. 1 and 7. The image producing part 66 can be a personal computer and is operable for generating an image result that represents the entire target region. The image producing part 66 produces the image result by arraying the image information acquired by the plurality of radio wave receiving devices 50.

The imaging system 3 begins operating upon receiving a prompt from a user or other external source. Upon receiving the prompt, signal components are generated by the radio receiving devices 50. Then, image information is acquired for each image unit of the target region. The image information is then stored in memory of the image producing part 66. Then, the image information is arrayed to thereby produce the image result.

Figure 11:
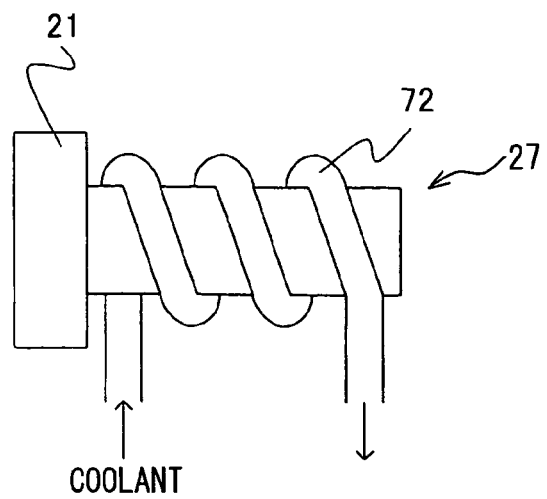
FIG. 11 is a schematic illustration of one embodiment of a thermostatic device of the imaging system.

Referring now to FIG. 11, one embodiment of a thermostatic device 27 is shown. The thermostatic device 27 can be employed in association with the terminator 21 and the temperature monitor 26 described above. The thermostatic device 27 is operable for maintaining the temperature of the terminator 21 approximately constant.

In the embodiment shown, the thermostatic device 27 includes a pipe 72 through which a coolant can flow. The pipe 72 can be made out of a thermally conductive material, such as copper. The pipe 72 is wound around the terminator 21. As the coolant flows through the pipe 72, heat transfers into or out of the terminator 21 to thereby adjust the temperature of the terminator 21 and maintain the temperature approximately constant. In one embodiment, the temperature of the terminator 21 is feedback-controlled by the thermostatic device 27 in a known manner.

Because the temperature of the terminator 21 remains relatively constant, the reference signals, and thus the signal components, are less likely to fluctuate. Accordingly, the image information is more likely to be accurate.

Figure 12:
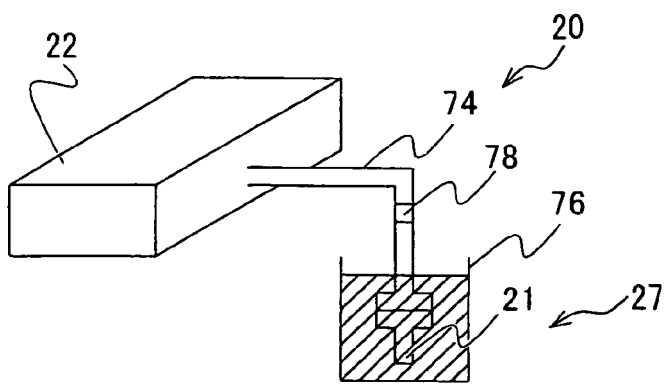
FIG. 12 is a schematic illustration of another embodiment of a radio signal receiving device of the imaging system.

Another embodiment of the radio wave receiving device 20 is illustrated in FIG. 12. As shown, the thermostatic device 27 includes a vessel 76 (e.g., a Dewars vessel) containing a coolant. The terminator 21 is immersed in the vessel 76 for maintaining the temperature of the terminator 21 approximately constant. The coolant can be of any suitable type such as water, liquid nitrogen, or liquid helium. Also, in one embodiment, the coolant is circulated around the terminator 21. In another embodiment, the thermostatic device 27 is a heat sink attached to the terminator 21. As such, the heat sink maintains the temperature of the terminator 21 at an approximately constant level.

The terminator 21 is spaced from the selective output device 22 and other components of the radio wave receiving device 20 such that the coolant is unlikely to cause adverse affects. For instance, the radio wave receiving device 20 is unlikely to be adversely affected due to condensation or freezing caused by the coolant.

Also, a waveguide 74 is interposed between the terminator 21 and the radio wave receiving device 20. The waveguide 74 is in communication with both the terminator 21 and the radio wave receiving device 20. A gas is included within the waveguide 74. In one embodiment, the gas is a dry gas (i.e., the gas contains substantially no moisture). The gas can be of any suitable type, such as nitrogen gas or helium gas. Also, the gas is sealed within the waveguide 74 such that the gas is unable to leak from the waveguide 74.

Furthermore, the waveguide 74 includes a transmitting member 78. The transmitting member 78 creates a portion of the seal within the waveguide 74. Also, the reference signal from the terminator 21 is able to transmit through the transmitting member 78. The transmitting member 78 may be made out of any suitable material, such as fluororesin (e.g., TEFLON™) or styrene foam.

Figure 13:
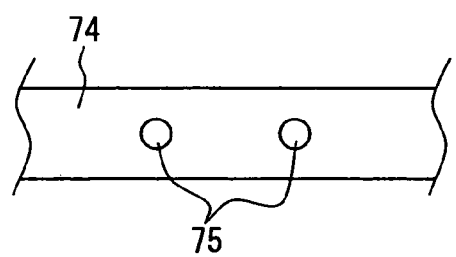
FIG. 13 is a schematic illustration of one embodiment of a waveguide of FIG. 12.

In another embodiment shown in FIG. 13, the waveguide 74 includes a plurality of circulation apertures 75 that allow gas to circulate into and out of the waveguide 74. As such, if moisture enters the waveguide 74, the moisture can be circulated out of the waveguide 74 through the circulation apertures 75.

Figure 14:
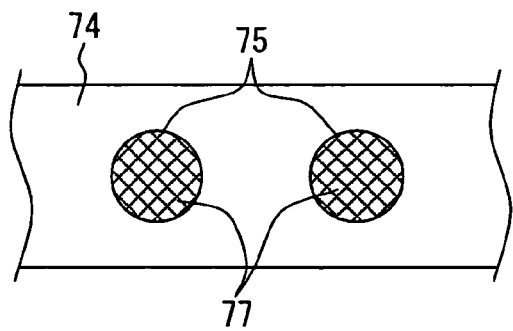
FIG. 14 is a schematic illustration of another embodiment of the waveguide of FIG. 12.

In one embodiment, the size of each circulation aperture 75 is significantly smaller than the wavelength of the reference signal. In another embodiment shown in FIG. 14, each circulation aperture 75 is covered with a meshed member 77. Each meshed member 77 includes a plurality of openings, and the openings are significantly smaller than the wavelength of the reference signal. Accordingly, the reference signal is unlikely to leak out from the waveguide 74 through the circulation apertures 75.

While only the selected embodiments have been chosen to illustrate the present invention, it will be apparent to those skilled in the art that various changes and modifications can be made therein without departing from the scope of the invention as defined in the appended claims. Furthermore, the foregoing description of the embodiments according to the present invention is provided for illustration only, and not for the purpose of limiting the invention as defined by the appended claims and their equivalents.

The invention claimed is:

1. An imaging system for producing an image of at least a portion of a target region, the imaging system comprising:

an antenna operable for receiving a received signal radiated from an image unit in the target region, the received signal including image information corresponding to the image unit in the target region;

a state shifting device operable to allow the antenna to receive a plurality of received signals from a plurality of image units in the target region;

a reference signal generator operable for generating a reference signal;

a pulse generator operable for generating a synchronizing signal;

a selective output device operable for alternatively outputting the received signal and the reference signal to a transmission path based on the synchronizing signal;

an information acquiring device operable for generating a plurality of signal components that each indicates a signal level difference between one of the received signals and the reference signal, and further operable for acquiring the image information from each of the signal components; and an image producing device operable for producing the image of the at least a portion of the target region based on the image information acquired from the signal components by arraying the image information; wherein the reference signal generator is a terminator for generating a white noise as the reference signal according to the temperature of the terminator, and the imaging system is a passive imaging system that receives radio waves radiated from the target region.

2. The imaging system according to claim 1, wherein the imaging system does not include a signal source.

* * * * *